United States Patent [19]                    [11] 4,272,419
Force                                               [45] Jun. 9, 1981

[54] TREATMENT OF STYRENE-BUTADIENE RUBBER

[75] Inventor: Carlton G. Force, Mt. Pleasant, S.C.

[73] Assignee: Westvaco Corporation, New York, N.Y.

[21] Appl. No.: 106,569

[22] Filed: Dec. 26, 1979

Related U.S. Application Data

[63] Continuation-in-part of Ser. No. 962,301, Nov. 20, 1978, abandoned.

[51] Int. Cl.³ .................. C08L 9/06; C08L 93/00
[52] U.S. Cl. .................. 260/27 BB; 260/28.5 B; 260/97.5
[58] Field of Search ............ 260/27 BB, 28.5 B, 97, 260/97.5, 97.6

[56]            References Cited
         U.S. PATENT DOCUMENTS

| 2,421,627 | 6/1947  | LaCrosse ............... 260/27 BB |
| 2,843,643 | 7/1958  | Gleim ................. 260/28.5 B |
| 3,157,609 | 11/1964 | McNay et al. ............. 260/97 |
| 3,238,164 | 3/1966  | Speck ................. 260/97.6 |
| 3,474,059 | 10/1969 | Body .................... 260/97 |
| 3,632,855 | 1/1972  | Halbrook et al. ......... 260/468.5 |
| 3,649,580 | 3/1972  | Arlt et al. ............. 260/24 |
| 3,873,482 | 3/1975  | Severson et al. ........ 260/97.5 |
| 3,926,936 | 12/1975 | Lehtinen ............... 260/97.5 |
| 3,943,117 | 3/1976  | Force .................. 260/97.5 |
| 3,965,060 | 6/1976  | Lakshmanan ............ 260/27 BB |
| 3,966,661 | 6/1976  | Feast et al. ........... 260/29.7 H |

FOREIGN PATENT DOCUMENTS 1079757 8/1967 United Kingdom .
1279939 6/1972 United Kingdom .

OTHER PUBLICATIONS

Chemical Abstracts, vol. 61, No. 4, Aug. 17, 1964, p. 4568e.
Chemical Abstracts, vol. 85, No. 26, Dec. 27, 1976, p. 194404h.

Primary Examiner—Ronald W. Griffin
Attorney, Agent, or Firm—Richard L. Schmalz; Terry B. McDaniel

[57]            ABSTRACT

The adhesion and tack properties of styrene-butadiene rubber (SBR) are improved by replacing from 1% to 25% of the rubber with saponified tall oil pitch, based on the dry weight of the SBR. The SBR may be carboxylated or uncarboxylated, filled or unfilled.

16 Claims, No Drawings

TREATMENT OF STYRENE-BUTADIENE RUBBER

This application is a continuation-in-part of application Ser. No. 962,301, filed Nov. 20, 1978, now abandoned.

BACKGROUND OF THE INVENTION

(1) Field of the Invention

The present invention relates to synthetic rubber compositions of improved tack and adhesion and, more particularly, to styrene-butadiene rubber, or SBR, and carboxylated SBR compositions of improved tack and adhesion. Further, the present invention relates to a process for producing such synthetic rubber compositions, whereby a mixture is formed of from 1% to 25% by dry weight saponified tall oil pitch and from 99% to 75% by dry weight SBR (either carboxylated or uncarboxylated). Fillers can also be included in the mixture as well as other ingredients.

(2) Description of the Prior Art

SBR has a relatively low polarity compared to other synthetic rubbers; and unlike natural rubber, SBR does not develop surface peroxidal activity upon mastication. Therefore, SBR has relatively poor inherent or processed tack. An adhesive is said to possess tack if, under the conditions of application, only light pressure is required to produce a bond sufficiently strong to require work to restore the interface to its original spearated state. Poor tack in SBR can be overcome by adding tackifiers, such as resins or natural rubber. The obvious drawback to using natural rubber, of course, is that any improvement realized is attained at the expense of using the very product which the polymer is intended to replace.

In German Offenlegungschrift No. 2,005,244, Aug. 6, 1970, natural rubber was used in conjunction with SBR latex to improve the tack of flexible, elastic, pressure-sensitive adhesive tapes prepared from polyvinyl chloride as support.

A tire is usually constructed by applying layers of rubber-coated fabric one to another, followed by a breaker strip, cushion, and tread. The layers must possess sufficient surface tack to adhere firmly one to another and to maintain the desired relative position of the various parts prior to vulcanization. Absence of tack in many cases causes difficulty in the building operation. Thus, tack is an important property in the tire-building field. A study published in 33 *Moscow Rubber-Chemical Technology*, 556–580 (1960) comparing tires of natural rubber; 100% butadiene-styrene rubber; and 100% Na butadiene rubber showed that failure of a tire body depends mainly either on unsatisfactory cohesive properties of the vulcanizate or insufficient adhesion of the layers and is due to hysteresis loss by frictional heat produced during use, causing stripping of the tread.

In tire building and recapping, tire tread compounds are essentially 100% synthetic rubber, most often SBR, which is lacking in building, or "laying up", tack. Therefore, when the tread compound comes out of the extruder, a natural rubber cement is applied on the underside of the tread. Sidewall sections are treated in a similar manner. When the tread is wrapped around the carcass, cement is applied to keep the tread splice in place until the "green" tire is vulcanized. The abovementioned study determined that use of cements for joining the layers reduces the dynamic bond strength of the plies. Improving the tack of SBR latex would eliminate, or substantially reduce, the need for the relatively expensive natural rubber in tire building and recapping.

It has been known for several years that incorporation of a very small percent of a copolymerizable unsaturated fatty acid monomer with styrene or styrene and butadiene improves the adhesive properties of the resulting polymer (i.e., Netherlands Application No. 6,411,493, Apr. 15, 1965—acrylic acid and fumaric acid and German Offenlegungschrift No. 2,437,365, Feb. 13, 1975—itaconic). Also, methacrylic and crotonic acids are suited to this purpose. In addition to improving adhesion, carboxylation provides reaction sites for cross-linking with curing agents to improve water resistance and improve processing properties. Thus, carboxylated polystyrene or styrene-butadiene rubber latex has been the backbone of many water-based adhesives for some time.

Just as natural rubber is added to SBR to improve its tack, addition of natural rubber latex to the carboxylated latex increases the wet grab (green tack) of the adhesive system. However, due to the high cost of natural rubber latex, the natural latex gradually has been removed from adhesive systems in certain applications, such as the tufted carpet industry where carboxylated SBR, usually highly-filled, is the most important carpet-backing adhesive. The function of the adhesive is to lock the tuft into the primary backing and bind the secondary backing or foam to the carpet underside. With the carboxylated SBR latex alone, however, wet grab to the secondary backing is borderline. If the secondary backing separates from the carpet at any stage of drying, the final bond will never be as strong as if a coherent system were retained throughout the drying cycle. For this reason, the carpet industry, in particular, is interested in more economic methods of increasing the green tack of the carboxylated SBR adhesive, thereby enhancing the final bond of carpet to backing.

The prior art includes many references to improving the properties of synthetic rubber by the incorporation therein of tall oil products. Four main products are usually obtained when refining crude tall oil distillation, namely, fore distillate (5–10%), tall oil fatty acids and a small amount of rosin-containing oils (30–35%), tall oil rosin (30–35%), and as a distillation residue, tall oil pitch (20–30%). Only the second and the third products are considered valuable raw materials and used by the chemical industry. In many distilleries at least the bulk of the fore distillate and the pitch is commonly burned.

In U.S. Pat. No. 2,843,643, demethylated wood tar distillate is added to natural rubber to prevent the cracking of the rubber due to attack by ozone. The patentee states that the invention can be utilized also for preventing ozone cracking in synthetic rubber (column 1, lines 60–71) and names SBR specifically.

In U.S. Pat. No. 3,157,609, pine tar and rosin acid soap are added with an extract of the plant Grindelia to a synthetic rubber polymer as a physical rubber softener, whereby the tack is improved in the resultant polymer.

U.S. Pat. No. 3,632,855 relates to a composition of matter formed by the reaction of one mole of rosin acid with one mole of a fatty olefin epoxide to give a hydroxy ester, useful as a tackifier in SBR rubber. It also teaches the reaction product of the hydroxy ester with a second mole of rosin to give a diester, which is also useful as a tackifier for SBR.

U.S. Pat. No. 3,474,059 teaches that the adhesive properties of elastomeric olefin polymers can be improved substantially by the incorporation therein of a relatively small amount of a tackifier additive comprised of at least two specific rosin-base materials.

In U.S. Pat. No. 3,649,580, the tack of an ethylene-propylene terpolymer rubber was improved by the addition of 1% to 20% tall oil pitch containing 80% to 100% nonvolatile material as a 40° C. to 90° C. solution in rubber processing oil. Thus, dark brown tall oil pitch was distilled in a Pfaulder wiped film evaporator at 275° C. and 0.5–1.0 mm. of mercury pressure until all volatile material was removed to give a tackifier of specific hardness.

U.S. Pat. No. 3,873,482 discloses a process by which commercial tall oil materials, a mixture of fatty acids and resin acids, are pyrolyzed in a hot tube to yield products which when added to a synthetic rubber composition improve its tack.

There have been processes proposed to improve the low quality, semifluid, tarlike, non-distillable tall oil pitch whereby it can be transformed into one or more products suitable for industrial applications.

For example, U.S. Pat. No. 3,926,936 discloses a process for manufacturing fatty acid and rosin, or a mixture of both, plus hard pitch of a new type from tall oil pitch.

U.S. Pat. No. 3,943,117 relates to a process for saponifying tall oil pitch and for hydrolyzing the fatty acid esters found in a tall oil pitch fraction using small amounts of a cationic amine catalyst at specific conditions.

Finally, in 19 *Izv. Vyssh. Uchebn. Zaved., Lesn. Zh.,* 1976, 113–116 (Russ.) the optimum saponification conditions of tall oil pitch, which give the highest yield of phytosterol, were determined by simplex analysis.

The saponified tall oil pitch of this invention is the bottom fraction (pitch) of a crude tall oil distillation which has been at least partially saponified such that the product of the saponification treatment has an acid number above the acid number of the pitch prior to its saponification.

It is theorized that the presence of saponified pitch product in mixture with any remaining unsaponified pitch facilitates the emulsification (or dispersion) of the unsaponified portion. At an acid number of about 70 or above, the saponified pitch is essentially completely water soluble; and for certain applications, a water soluble pitch may be preferred. However, to achieve the improved tackifying properties of this invention, water-miscibility only is required.

The object of the present invention is to provide synthetic rubber compositions with improved tack and adhesion, and, more particularly, to provide sytrene-butadiene rubber and carboxylated SBR compositions of improved tack and adhesion. While the composition of the invention is suitable for any application wherein a sytrene-butadiene rubber with enhanced tack and adhesion properties is desired, it is particularly suited to use an an adhesive in tufted carpet manufacturing (wherein the SBR is carboxylated) and for use in tire manufacturing and retreading (wherein the SBR is uncarboxylated). Other areas of application of this invention would be in paper saturation and synthetic rubber soles for footwear.

SUMMARY OF THE INVENTION

It has been found that by forming a mixture of from 1% to 25% by dry weight of saponified tall oil pitch, preferably from 1% to 15%, and from 99% to 75% by dry weight of SBR, preferably from 95% to 91%, carboxylated or uncarboxylated, the tack and adhesion properties of the rubber are enhanced, whether or not a filler, such as calcium carbonate or carbon black is added. Also, depending upon the particular application, additional ingredients, such as antioxidants, extending oils, thickeners, water, etc., may be employed without impairing the tack and adhesion properties of the SBR. Further, the inclusion of saponified tall oil does not detrimentally affect the other properties of the SBR, such as aging, water resistance, etc.

DESCRIPTION OF THE PREFERRED EMBODIMENT

The practice of this invention comprises forming a mixture of from 99% to 75% by dry weight of styrene-butadiene rubber latex, preferably from 95% to 91%, and from 1% to 25% by dry weight of a saponified tall oil pitch, preferably from 1% to 15%. The styrene content of the SBR will depend upon the particular application. For instance, SBR as employed in tire manufacturing and retreading contains from about 15% to about 40% styrene; and carboxylated SBR as employed in carpet manufacture contains from about 40% to about 65% styrene. Also, the method of incorporating the saponified tall oil into the SBR is dependent upon the application involved. For example, for retread tire applications, the saponified tall oil is added to the latex (in an oil emulsion) at about 60° C. before coagulation into crumb, the incorporation of tackifier occurring upon pH precipitation. In tufted carpet manufacture, the water-soluble saponified tall oil tackifier is added to the carboxylated SBR by blending while heating to less than 50° C. with agitation.

The utility of the invention is apparent from specific operative embodiments set forth in the following examples.

EXAMPLE 1

Latex carpet backing adhesives were prepared containing 0, 6, 7, 8, 9, 10, 12 and 15 percent by weight, of saponified tall oil pitch (Westvaco CUSTOFAC® CS) and 100, 94, 93, 92, 91, 90, 88 and 85 percent, respectively, by dry weight of a carboxylated SBR latex (Firestone FR-S 256). The latex and saponified pitch were blended by heating to less than 50° C. with agitation. Water was added to make up for water loss during heating and to adjust the solids content of the final product to 82%. While stirring, $CaCO_3$ was gradually added in the amount of 400 parts dry weight per 100 parts dry weight of the rubber plus saponified pitch. The viscosity of the mixture was increased to from greater than 16,000 to less than 20,000 centipoise in each sample by the dropwise addition of a polyacrylate thickener (Rockmart RH 46). Viscosity measurements were obtained using a Brookfield RVH Viscometer, spindle #5, at 10 RPM.

Rectangles, 14 inches by 8 inches, of both raw tufted carpet (in a woven polypropylene primary backing material) and jute were cut for each formulation prepared. Approximately 72 grams of the latex adhesive were spread on the 14-inch by 6-inch portion of the underside of the carpet (32 ozs./yd.$^2$). Next, the secondary jute backing was applied against the latex adhesive and the sample was rolled with an iron shaft (22½ inches long, 7/8 inch in diameter, and weighing 1,739.4 grams) once across the width and once from the center to each side across the length of each sample. The sample was then placed in a 135° C. oven to cure.

Two-inch by eight-inch strips were cut after 3, 5, 7, 9, 11 and 15 minutes heating. After removal from the oven and cutting, each strip was tested immediately in a Scott Tester, Model No. L5, to measure the strength of the bond. The remaining 2-inch by 8-inch strip was removed from the oven after 15 minutes, cooled slightly, and saturated with water. The bond of the wet sample was also measured with the Scott Tester. The results are reported in Table I.

TABLE I

COMPARISONS OF VARIOUS AMOUNTS OF SAPONIFIED TALL OIL PITCH IN LATEX CARPET BACKING

| Saponified Tall Oil Pitch (%) | Average Weight Spread (g) | Viscosity (cps) | Mean Bond Strength Minutes in Oven | | | | | | Wet | Total |
|---|---|---|---|---|---|---|---|---|---|---|
| | | | 3 | 5 | 7 | 9 | 11 | 15 | | |
| 0 | 71.2 | 18400 | 9.3 | 11.5 | 14.8 | 18.4 | 11.75 | 13.1 | 24.1 | 14.7 |
| 6 | 75.4 | 19720 | 9.75 | 20.25 | 39.2 | 20.5 | 18.4 | 17.9 | 43.9 | 24.3 |
| 7 | 73.8 | 18800 | 12.3 | 16.25 | 22.5 | 17.2 | 18.5 | 14.9 | 56.7 | 22.6 |
| 8 | 72.7 | 17080 | 14.3 | 14.6 | 15.9 | 18.1 | 15.8 | 13.9 | 49.0 | 20.2 |
| 9 | 72.7 | 18880 | 12.25 | 19.6 | 16.9 | 19.0 | 18.4 | 18.7 | 57.2 | 23.1 |
| 10 | 69.2 | 19800 | 10.6 | 12.7 | 11.0 | 20.25 | 18.2 | 11.2 | 35.3 | 17.0 |
| 12 | 75.6 | 18800 | 4.6 | 8.3 | 15.1 | 17.6 | 11.6 | 15.75 | 44.3 | 16.75 |
| 15 | 77.1 | 16160 | 1.0 | 8.3 | 14.0 | 12.8 | 15.25 | 17.75 | 55.1 | 17.75 |

Addition of saponified tall oil pitch improved both the initial tack and final adhesion of the carboxylated SBR latex carpet backing. Table I shows mean values obtained for the bond strength between the carpet and the jute backing. In most cases the bond strengths were higher with saponified tall oil pitch than with carboxylated SBR alone. Replacement of 15% carboxylated SBR with saponified tall oil pitch continues to improve final bond strength. Replacement of 6% to 10% carboxylated SBR with saponified tall oil pitch gives green tack and adhesion values generally higher than carboxylated SBR alone. Improved adhesion was achieved in every case in the wet sample.

The saponified pitch employed in this Example 1 and the following Example 2 was water-soluble, having an acid number above 70.

EXAMPLE 2

For a comparison of the ability of saponified tall oil pitch to enhance tack and adhesion in synthetic rubber, samples of styrene-butadiene copolymer rubber were prepared both with known synthetic rubber tackifiers and without a tackifier. The samples were evaluated via the standard Monsanto Tel-Tak Test. The known synthetic rubber tackifiers tested were rosin (tall oil based), Resinex ® (petroleum based) and phenolic resin (coal-tar based). In each case, the tackifier was added in an amount of 5 phr. (parts per hundred parts rubber) or 4.8% by dry weight of the tackifier. These samples were prepared according to Table II.

TABLE II

COMPOUNDING FOR TACKIFIER EVALUATION

| | Control (#1) | Tackified Samples | | |
|---|---|---|---|---|
| | Master Batched | Master Batched | Master Batched | |
| S-BR Latex Type 1712 | 100 | 100 | 100 | |
| Sundex 8125 Extending Oil 58% Emulsion (4% Emulsifier | 62.5 phr. | 62.5 phr. | 62.5 phr. | |
| Antioxidant (25% Solution) | 1 phr. | 1 phr. | 1 phr. | |
| Saponified Pitch or Rosin Tackifier (25% Solution) | — | 5 phr. | — | |

| | Master Batched at 60° C. in 5% NaCl Solution at pH 2 | | |
|---|---|---|---|
| | Roll Milled | Roll Milled | Roll Milled |
| Resinex ® 100 or Phenolic Resin | — | — | 5 phr. |
| Carbon Black N-339 | 82.5 phr. | 82.5 phr. | 82.5 phr. |
| Zinc Oxide | 5 phr. | 5 phr. | 5 phr. |
| Altax | 1.5 phr. | 1.5 phr. | 1.5 phr. |
| Monex | 0.1 phr. | 0.1 phr. | 0.1 phr. |
| Sulfur | 2 phr. | 2 phr. | 2 phr. |

The carbon black was roll milled 18 minutes. Zinc oxide, Altex and Monex were roll milled for 3 minutes and then sulfur for 3 minutes. The compound was banded 10 times after all ingredients were added. All roll milling was done starting with rolls at room temperature except for the Resinex ® sample where the last 3 minutes of the 18-minute cycle were carried out at 70° C. to disperse the Resinex ®.

The Tel-Tak results are contained in Table III.

TABLE III

TEL-TAK RESULTS ON RUBBER COMPOUNDS CONTAINING 5 PPH TACKIFIER

| | Tack (psi) | Stick to Stainless Steel (psi) |
|---|---|---|
| Control (No Tackifier) | 21.3 | 21.3 |
| Resinex ® 100 | 30.5 | 35.4 |
| Saponified Tall Oil Pitch | 30.6 | 35.9 |
| Rosin | 28.8 | 35.5 |
| Phenolic Resin | 27.4 | 33.3 |

Of the two water-soluble tackifiers, rosin and saponified tall oil pitch, the latter produced both the highest tack and stick of stainless steel. The saponified pitch was essentially identical to the tack and stick produced by Resinex ® 100, and significantly higher than the tack and stick produced by the phenolic resin.

EXAMPLE 3

In order to show the tackifying properties achieved by replacing a portion of the rubber with partially saponified tall oil pitch which is not water-soluble but is water-miscible, partially saponified tall oil pitch having acid numbers below 70 was substituted for 8% of carboxylated SBR latex in the manner described in Example 1. Further, backs of carpet samples were evenly coated with 28 ounces per square yard and heat cured.

Strips of the carpet were cut and immediately tested for bond strength after 3, 6, 9 and 15 minutes cure time. Also, a dry 15 minute cured sample was tested after being allowed to cool. The control contained no saponified pitch.

The results are reported in Table IV.

TABLE IV.

| Unsaponified Tall Oil Pitch Acid No. | Saponified Tall Oil Pitch (%) | Saponified Tall Oil Pitch Acid No. | Mean Bond Strength Minutes Heated | | | | Cold and Dry |
|---|---|---|---|---|---|---|---|
| | | | 3 | 6 | 9 | 15 | |
| — | 0 | — | 11.3 | 72.5 | 10.6 | 110.8 | 144.8 |
| 39.0 | 8 | 60.1 | 8.3 | 51.3 | 75.5 | 74.8 | 150. |
| 31.6 | 8 | 40.0 | 28.1 | 40.8 | 47.8 | 47.5 | 137.5 |

Thus, partially saponified tall oil pitch which is not completely water-soluble can be substituted for a portion of the synthetic rubber resulting in comparable or enhanced tack properties. In the case of the saponified pitch with an acid number of about 60, the initial or "green" tack is comparable to the control and the final tack (cold and dry) is improved over the control. In the case of the saponified pitch with an acid number of about 40, the "green" tack is improved and the final tack is comparable to the control.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A styrene-butadiene copolymer rubber composition comprising styrene-butadiene copolymer rubber and as a tackifier from 1% to 25% based on dry weight of the rubber of a tall oil pitch which has been at least partially saponified.

2. The composition of claim 1 wherein the styrene-butadiene copolymer rubber is carboxylated.

3. The composition of claim 1 wherein the styrene-butadiene copolymer rubber has a styrene content of from 15% to 65%.

4. The composition of claim 1 wherein the saponified tall oil pitch has an acid number above the acid number of the tall oil pitch before saponification.

5. The composition of claim 1 wherein the saponified tall oil pitch has an acid number above 40.

6. The composition of claim 1 wherein the saponified tall oil pitch has an acid number above 60.

7. The composition of claim 1 wherein the saponified tall oil pitch has an acid number above 70.

8. The composition of claim 1, 2, 3, 4, 5, 6 or 7 wherein the saponified tall oil pitch comprises from about 1% to 15% based on dry weight of the rubber.

9. A method of imparting improved tack and adhesion characteristics to styrene-butadiene copolymer rubber which comprises adding to a styrene-butadiene copolymer rubber latex as a tackifier from 1% to 25% by dry weight of the rubber latex of a tall oil pitch which has been at least partially saponified.

10. The method of claim 9 wherein styrene-butadiene copolymer rubber latex is carboxylated.

11. The method of claim 9 wherein the rubber has a styrene content of from 15% to 65%.

12. The method of claim 9 wherein the saponified tall oil pitch has an acid number above the acid number of the tall oil pitch before saponification.

13. The method of claim 9 wherein the saponified tall oil pitch has an acid number above 40.

14. The method of claim 9 wherein the saponified tall oil pitch has an acid number above 60.

15. The method of claim 9 wherein the saponified tall oil pitch has an acid number above 70.

16. The method of claim 9, 10, 11, 12, 13, 14 or 15 wherein the saponified tall oil pitch is added in an amount from 1% to 15% based on dry weight of the rubber latex.

* * * * *